Figure 4:
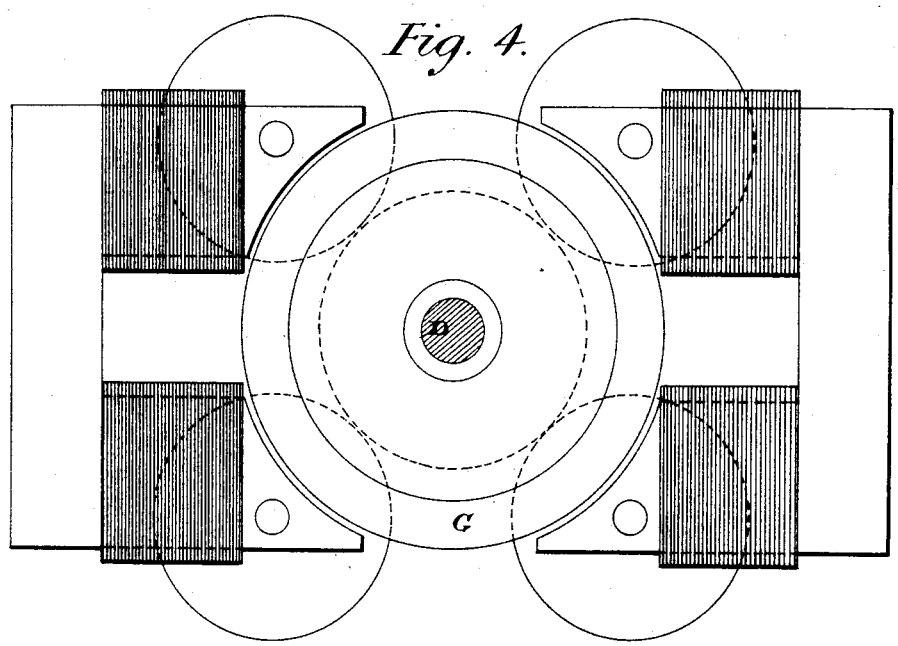

(No Model.) 3 Sheets—Sheet 1.
S. Z. DE FERRANTI.
ELECTRO LOCOMOTIVE ENGINE.
No. 402,311. Patented Apr. 30, 1889.
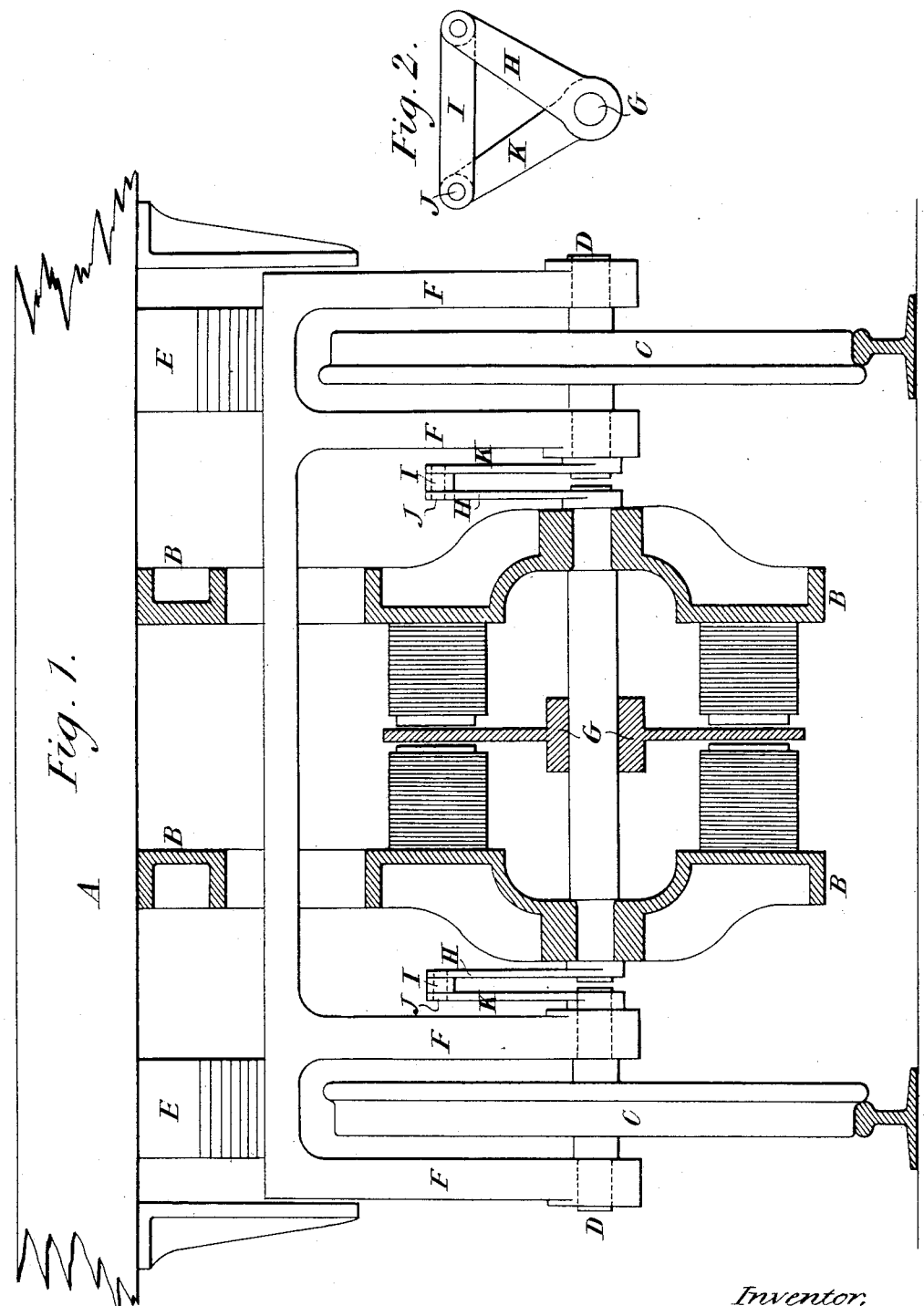
Witnesses
Lloyd B. Wight
Baltus De Long
Inventor:
Sebastian Ziani de Ferranti
By his Attys.
Baldwin Davidson & Wight

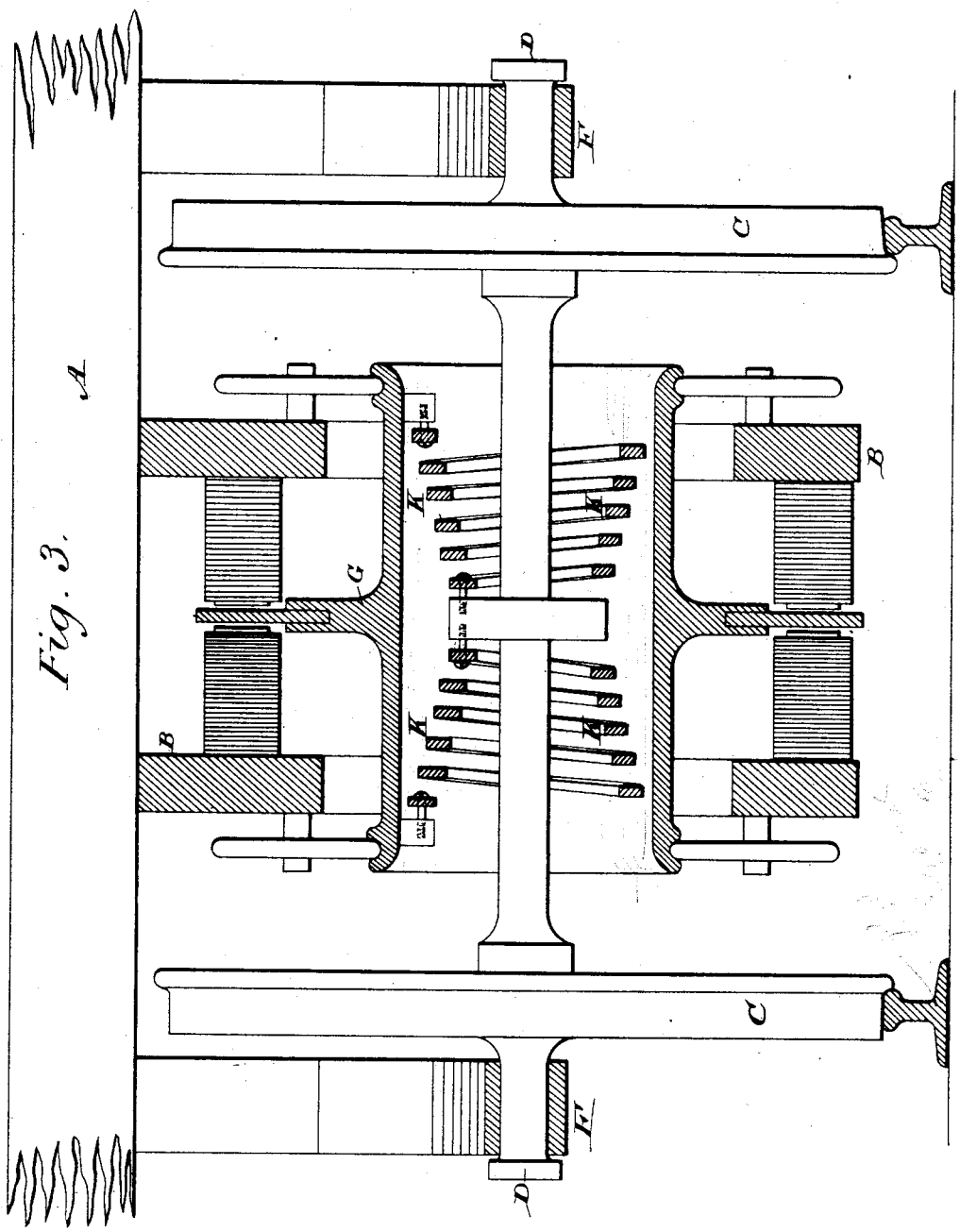

(No Model.) 3 Sheets—Sheet 3.

S. Z. DE FERRANTI.
ELECTRO LOCOMOTIVE ENGINE.

No. 402,311. Patented Apr. 30, 1889.

Witnesses, Inventor,
Lloyd B. Wight Sebastian Ziani de Ferranti
Baltus D. Long. By his Attys,
Baldwin Davidson & Wight

UNITED STATES PATENT OFFICE.

SEBASTIAN ZIANI DE FERRANTI, OF HAMPSTEAD, COUNTY OF MIDDLESEX, ENGLAND.

ELECTRO LOCOMOTIVE-ENGINE.

SPECIFICATION forming part of Letters Patent No. 402,311, dated April 30, 1889.

Application filed September 24, 1888. Serial No. 286,204. (No model.) Patented in England September 13, 1887, No. 12,419.

*To all whom it may concern:*

Be it known that I, SEBASTIAN ZIANI DE FERRANTI, electrician, a subject of the Queen of Great Britain, residing at 120 Fellows Road, Hampstead, in the county of Middlesex, England, have invented certain new and useful Improvements in Electro Locomotive-Engines, of which the following is a specification.

Letters Patent have been granted to me upon this invention in Great Britain No. 12,419, of September 13, 1887.

In the construction of electro locomotive-engines I place the armature of the electromotor-engine between a pair of driving-wheels with its axis aligned with the axle or axles of the wheels, and I couple them together by couplings which allow a certain amount of movement of one out of line with the other. Diagram drawings of examples of electro locomotive-engines so formed are shown in the drawings annexed.

Figure 1 is an elevation, partly in section, showing one form of my invention. Fig. 2 is a detail of the same. Fig. 3 shows a modification, and Figs. 4 and 5 another modification.

In the construction shown at Fig. 1, A is the lower part of the frame of a locomotive or carriage. B is the framing of an electromotor rigidly fixed thereto. C C are the driving-wheels, each provided with a short axle, D. E E are springs interposed between the frame F, which carries the bearings for these short axles and the body of the carriage. G is the armature of the electromotor. H H are radial arms on the ends of the armature-axis carrying crank-pins, which, as shown at Fig. 2, are coupled by links I to crank-pins J on other arms, K, fixed to the short axles.

In some cases I form the axis of the armature hollow and support it at its ends in roller-bearings. The axle of the driving-wheels I pass through the axis of the armature, so that it has sufficient play within it, and, as before, I connect the axle with the axis of the armature by flexible couplings.

A transverse section of an electromotor driving a pair of driving-wheels in the above manner is shown at Fig. 3. In this figure the axle of the driving-wheels is shown to be driven through coiled springs K from the hollow axis of the armature; but the wheels may be driven in other ways from the armature—as, for example, by links in the manner shown at Fig. 1, or by other well-known means for transmitting a revolving motion from one shaft to another, where the shafts do not always remain concentric one with the other.

When an alternating current is used for working the engines, a synchronizing commutator running independently may be used to make the current continuous and so capable of driving the motor-engine; but if a continuous current is supplied to them from the line-conductor no contrivance of this kind is required.

Figure 5:
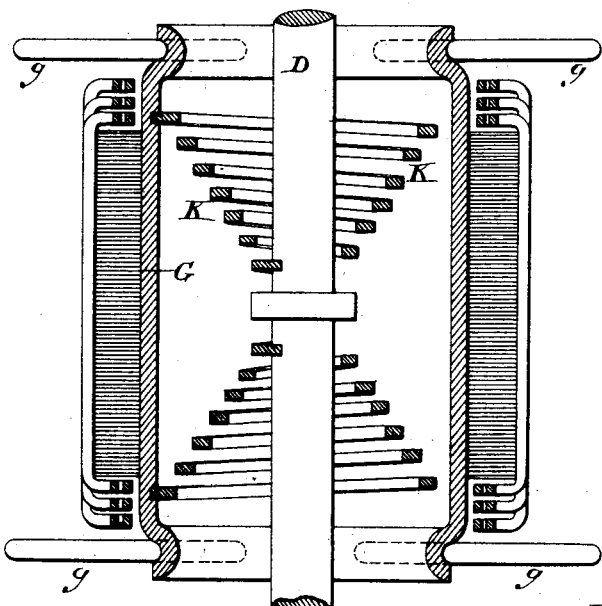

In Figs. 4 and 5 I have shown the motor as being formed with an ordinary drum-armature, G, mounted on bearing-rollers $g$, and with fixed magnets acting upon opposite sides of it, as in ordinary dynamo-machines, for producing continuous current.

For the purpose of magnetizing the field-magnets of the motors on the locomotive, I may employ a source of energy carried on the locomotive—for instance, storage-batteries.

Having now particularly described and ascertained the nature of my said invention and in what manner the same is to be performed, I declare that what I claim is—

1. The combination, with the frame and driving-wheels of an electric locomotive-engine, of a dynamo-electric machine placed between the driving-wheels of the locomotive, with its armature concentric with the axle or axles of the wheels, and flexing couplings between the axle and armature which allow the frame of the locomotive and the dynamo which it carries to play up and down freely.

2. In an electric locomotive, the combination, substantially as set forth, with the wheels and axle or axles, of a dynamo-electric machine having its armature arranged concentrically with the axle or axles and flexing couplings by which the armature drives the latter, whereby the armature may independently vibrate or play up and down.

3. In an electric locomotive, the combination, substantially as set forth, of the driving-wheels and axles, a dynamo-electric machine having a hollow armature through which the axle passes, and flexing couplings by which the armature drives the axle, whereby the armature may play independently of the axle.

SEBASTIAN ZIANI DE FERRANTI.

Witnesses:
   JNO. H. WHITEHEAD,
    24 *Southampton Buildings, London.*
   WALTER J. SKERTEN,
    17 *Gracechurch Street, London, E. C.*